(12) United States Patent
Partanen et al.

(10) Patent No.: US 7,811,373 B2
(45) Date of Patent: Oct. 12, 2010

(54) INCORPORATION OF HEAT-TREATED RECYCLED TIRE RUBBER IN ASPHALT COMPOSITIONS

(75) Inventors: John Eric Partanen, Colton, CA (US); Stanley W. Ellis, Bakersfield, CA (US)

(73) Assignee: Sierra Process Systems, Inc., Bakersfield, CA (US)

( * ) Notice: Subject to any disclaimer, the term of this patent is extended or adjusted under 35 U.S.C. 154(b) by 166 days.

(21) Appl. No.: 11/863,821

(22) Filed: Sep. 28, 2007

(65) Prior Publication Data

US 2009/0084287 A1     Apr. 2, 2009

(51) Int. Cl.
 *C09D 4/00* (2006.01)
 *C09D 101/00* (2006.01)
 *C09D 201/00* (2006.01)

(52) U.S. Cl. .......................... 106/284.01; 106/284.05; 106/284

(58) Field of Classification Search .................. 524/59, 524/60; 106/284, 284.1, 284.01, 284.05
See application file for complete search history.

(56) References Cited

U.S. PATENT DOCUMENTS

| | | | |
|---|---|---|---|
| 2,783,213 A | 2/1957 | Le Beau | |
| 3,891,585 A | 6/1975 | McDonald | |
| 3,919,148 A | 11/1975 | Winters et al. | |
| 4,018,730 A | 4/1977 | McDonald | |
| 4,021,393 A | 5/1977 | McDonald | |
| 4,068,023 A | 1/1978 | Nielsen et al. | |
| 4,069,182 A | 1/1978 | McDonald | |
| 4,085,078 A | 4/1978 | McDonald | |
| 4,139,397 A | 2/1979 | Yan | |
| 4,157,320 A | 6/1979 | Yankner et al. | |
| 4,166,049 A | 8/1979 | Huff | |
| 4,175,211 A | 11/1979 | Chen et al. | |
| 4,177,079 A | 12/1979 | Espenscheid | |
| 4,211,576 A | 7/1980 | Yan | |
| 4,278,469 A | 7/1981 | Yan et al. | |
| 4,310,446 A | 1/1982 | Gaus et al. | |
| 4,381,357 A | 4/1983 | Von der Wettern et al. | |
| 4,437,896 A | 3/1984 | Partanen | |
| 4,485,201 A | 11/1984 | Davis | |
| 5,290,833 A | 3/1994 | Schmanski | |
| 5,334,641 A | 8/1994 | Rouse | |
| 5,397,818 A | 3/1995 | Flanigan | |
| 5,486,554 A | 1/1996 | Truax | |
| 5,492,561 A | 2/1996 | Flanigan | |
| 5,496,400 A | 3/1996 | Doyle et al. | |
| 5,525,653 A | 6/1996 | Rouse | |
| 5,558,704 A * | 9/1996 | Masuda et al. | 106/281.1 |
| 5,583,168 A | 12/1996 | Flanigan | |
| 5,704,971 A | 1/1998 | Memon | |
| 5,719,215 A * | 2/1998 | Liang et al. | 524/62 |
| 5,735,948 A | 4/1998 | Cha et al. | |
| 5,811,477 A * | 9/1998 | Burris et al. | 524/60 |
| 5,938,832 A * | 8/1999 | Memon | 106/472 |
| 5,948,827 A * | 9/1999 | Lupo et al. | 521/40 |
| 5,959,007 A * | 9/1999 | Liang | 524/62 |
| 6,139,612 A * | 10/2000 | Kitagawa et al. | 106/284.1 |
| 6,156,828 A * | 12/2000 | Wickett | 524/60 |
| 6,277,904 B1 * | 8/2001 | Nicholas | 524/59 |
| 6,444,731 B1 * | 9/2002 | Memon | 524/59 |
| 6,478,951 B1 | 11/2002 | Labib et al. | |
| 6,590,042 B1 * | 7/2003 | Tang | 525/332.6 |
| 6,706,787 B1 * | 3/2004 | Burris et al. | 524/60 |
| 6,818,687 B2 * | 11/2004 | Memon | 524/68 |
| 7,025,822 B2 | 4/2006 | Partanen et al. | |
| 7,417,082 B2 * | 8/2008 | Martin | 524/68 |
| 7,446,139 B2 * | 11/2008 | Martin | 524/68 |
| 2004/0132841 A1 * | 7/2004 | Benko et al. | 521/40 |
| 2004/0225036 A1 * | 11/2004 | Sylvester et al. | 524/59 |
| 2005/0011407 A1 | 1/2005 | Partanen | |
| 2005/0027046 A1 | 2/2005 | Partanen | |
| 2005/0131113 A1 * | 6/2005 | Sylvester | 524/59 |
| 2005/0165140 A1 * | 7/2005 | Pillai et al. | 524/59 |
| 2005/0241529 A1 | 11/2005 | Partanen et al. | |
| 2006/0009551 A1 * | 1/2006 | Amme et al. | 524/59 |
| 2006/0116431 A1 * | 6/2006 | McFarlane et al. | 521/41 |
| 2006/0130704 A1 | 6/2006 | Partanen | |
| 2006/0243163 A1 * | 11/2006 | Martin | 106/273.1 |
| 2006/0249049 A1 * | 11/2006 | Martin | 106/273.1 |
| 2006/0281956 A1 * | 12/2006 | Bochaver | 585/241 |
| 2007/0049664 A1 | 3/2007 | Partanen | |
| 2007/0072962 A1 * | 3/2007 | Buras | 524/59 |
| 2008/0271639 A1 * | 11/2008 | Partanen et al. | 106/273.1 |
| 2009/0012214 A1 * | 1/2009 | Butler et al. | 524/59 |

\* cited by examiner

*Primary Examiner*—Mark Eashoo
*Assistant Examiner*—Liam J Heincer
(74) *Attorney, Agent, or Firm*—Townsend and Townsend and Crew LLP

(57) ABSTRACT

Recycled tire rubber, either in the presence or the absence of carbonaceous waste solids such as those from petroleum refinery operations, is first subjected to a heat treatment to release volatile materials and then combined with a liquid asphalt composition to achieve an asphalt mastic that is storage stable and of uniform consistency.

19 Claims, No Drawings

INCORPORATION OF HEAT-TREATED RECYCLED TIRE RUBBER IN ASPHALT COMPOSITIONS

BACKGROUND OF THE INVENTION

1. Field of the Invention

This invention resides in asphalt technology and asphalt formulations, and also in waste management, particularly in connection with recycled tire rubber.

2. Description of the Prior Art

The question of how to dispose of used or scrap automobile tires has been a matter of public concern since the mid-1970's. Over 250 million scrap tires are generated each year in the United States alone, and comparable problems exist in nearly every country.

Reclamation of the rubber from used tires is extremely difficult and costly. Reclamation requires that the vulcanized rubber in the tires be de-vulcanized by breaking carbon-to-carbon and carbon-to-sulfur bonds without destroying the polymer backbone chains. The rubber must also be separated from the resins, oils, carbon black and mineral fillers that are also part of the tire composition, and this must be done after the tires have been chopped and granulated and the steel and fibers from the belted layers removed. Most prior art processes for tire rubber reclamation involve mixing the granulated scrap tires with solvents, treatment chemicals, thermoset plastics, or mineral fillers and heating the resulting mixture to temperatures ranging from 37° C. (100° F.) to 400° C. (752° F.) under a pressure of 1 to 2.5 atmospheres, resulting in a plastic-like end product that can easily be processed, combined with natural or synthetic rubber virgin polymers if desired, and re-vulcanized. Patents disclosing these processes include Le Beau U.S. Pat. No. 2,783,213, issued Feb. 26, 1957, which discloses a process involving the addition of a mineral filler; Yankner et al. U.S. Pat. No. 4,157,320, issued Jun. 5, 1979, disclosing the use of a rubber processing aid made from petroleum absorbed on attapulgite clay, kaolin clay, or synthetic calcium silicate clay; Crivelli U.S. Pat. No. 5,258,222, issued Nov. 2, 1993, disclosing the use of siliceous crystalline grains with a vulcanizable polymer; and Chen U.S. Pat. No. 5,286,374, issued Feb. 15, 1994, disclosing the catalytic cracking of tire rubber at 240° C. (446° F.) to 400° C. (752° F.) under pressure in the presence of a mica catalyst such as muscovite, sericite, or bioltite, each of which is a form of potassium aluminum fluorosilicate.

The recycling of tire rubber has generated more interest than reclamation. Recycling involves granulation of the tires and removal of the steel and fiber so that the rubber can be used for alternative processes. Among the most common uses of recycled tire rubber is the incorporation of the rubber into bituminous materials, primarily petroleum asphalt. Early studies on the incorporation of tire rubber into asphalt were made by Charles H. McDonald as disclosed in his U.S. Pat. No. 3,891,585, issued Jul. 5, 1973, followed by his later U.S. Pat. No. 4,018,730, issued Apr. 19, 1977, U.S. Pat. No. 4,021,393, issued May 3, 1977, U.S. Pat. No. 4,069,182, issued Jan. 17, 1978, and U.S. Pat. No. 4,085,078, issued Apr. 18, 1978. With co-inventor Winters, in U.S. Pat. No. 3,919,148, Nov. 11, 1975, McDonald discloses the use of recycled tire rubber in combination with an elastomeric paving material to form a paving asphalt. Nielsen and Bagley, in U.S. Pat. No. 4,068,023, Jan. 10, 1978, disclose the addition of reclaimed rubber to molten paving asphalts with the further inclusion of low viscosity aromatic oils. Huff, in U.S. Pat. No. 4,166,049, Aug. 28, 1979, discloses a rubberized asphalt prepared from asphalt, oil, scrap rubber, and devulcanized scrap rubber. Yan, in U.S. Pat. No. 4,139,397, Feb. 13, 1979, U.S. Pat. No. 4,211,576, Jul. 8, 1980, and U.S. Pat. No. 4,278,469, Jul. 14, 1981, discloses paving asphalt compositions prepared by heating a mixture of coal tar and fluidized catalytic cracking syntower bottoms to achieve a product with asphalt properties. Gaus and Klabunde, in U.S. Pat. No. 4,310,446, Jan. 12, 1982, disclose a joint sealant composition that is compatible with asphalt and that contains an aromatic petroleum tar, an oil-soluble ground rubber, an inorganic filler, and polyvinylchloride. Von der Wettern and Albrecht, in U.S. Pat. No. 4,381,357, Apr. 26, 1983, disclose a road covering consisting of broken stone as mineral fillers, reclaimed rubber, and bitumen. John Eric Partanen, in U.S. Pat. No. 4,437,896, Mar. 20, 1984, discloses synthetic asphalt mixtures containing tall oil pitch, gilsonite, asphalt, aggregate, and recycled tire rubber. Davis, in U.S. Pat. No. 4,485,201, Nov. 27, 1984, discloses mixtures of asphalt, SBS polymer, and granulated tire rubber. Schmanski, in U.S. Pat. No. 5,290,833, Mar. 1, 1994, discloses coated ground tire rubber particles combined with asphalt, sand and gravel. Rouse discloses petroleum asphalt combined with minus-50 mesh recycled tire rubber particles in U.S. Pat. No. 5,334,641, Aug. 2, 1994, and with minus-80 mesh recycled tire rubber particles in U.S. Pat. No. 5,525,653, Jun. 11, 1996. Flanigan discloses the combination of distillation tower bottoms (asphalt) and tire rubber mixtures that are air blown at 6 to 15 pounds per square inch at temperatures of 176° C. (350° F.) to 260° C. (500° F.) in U.S. Pat. No. 5,397,818, Mar. 14, 1995, and various other methods of incorporating tire rubber into asphalt in U.S. Pat. No. 5,492,561, Feb. 20, 1996, and U.S. Pat. No. 5,583,168, Dec. 10, 1996. Truax discloses a mixture of foamed asphalt and tire rubber in U.S. Pat. No. 5,486,554, Jan. 23, 1996. Memon, in U.S. Pat. No. 5,486,554, Jan. 6, 1998, discloses the combination of asphalt and crumb rubber mixed with peroxide plus a glycidyl-containing monomer as an additive. Labib et al., in U.S. Pat. No. 6,478,951, Nov. 12, 2002, disclose a crumb rubber-modified asphalt in which the crumb rubber is coated with a compatibilizer containing a glycidyl group to more fully interact with the asphalt. John Eric Partanen et al., in U.S. Pat. No. 7,025,822, Apr. 11, 2006, disclose asphalt mastics containing refinery solids and including granulated recycled tire rubber. A U.S. patent application Ser. No. 11/744,399, filed on May 4, 2007 by John Eric Partanen et al. and pending as of the filing date of the present application, discloses combinations of asphalt, granulated recycled tire rubber, and spent pulverized recycled activated carbon. Other patent documents of John Eric Partanen relating to asphalt compositions that incorporate recycled tire rubber are published patent applications US 2005/0011407 A1 (Jan. 20, 2005), US 2005/0027046 A1 (Feb. 3, 2005), US2006/0130704 A1 (Jun. 22, 2006), and US 2007/0049664 A1 (Mar. 1, 2007). The compositions in these latter Partanen documents are asphalt/water emulsions that are further water-dilutable and designed for use as a slurry seal to be applied as a thin coating on streets and highways.

An alternative to reclamation and recycling is pyrolysis. Pyrolysis is performed at temperatures in excess of 260° C. (500° F.) in the absence of oxygen and produces a product mixture containing about 6% gaseous products, 55% oily products, 9% steel, 5% fiber, 19-20% carbon black, 2-3% mineral fillers, 1-2% sulfur, and 3-4% destroyed polymer, all by weight. The oily products can be burned to generate the heat required for the pyrolysis, and some of the solid products can be recovered and reused, although most of the solid products are typically disposed of as "flyash." Pyrolysis generates large amounts of heat which can be utilized in conjunc- A process to co-recycle large pieces of shredded rubber tires with residua, 600 w cylinder oil, waste motor oil, trim gas oil, vacuum heavy bottoms, decanted oil, and combinations thereof is disclosed by Cha in U.S. Pat. No. 5,735,948, Apr. 7, 1998. In this process, the recycled material is combined with crushed mineral fillers that are either calcium carbonate, calcium hydroxide, calcium oxide, magnesium carbonate, magnesium hydroxide, dolomite, sodium carbonate, sodium hydroxide, potassium carbonate, potassium hydroxide, iron oxide, bauxite or red mud from aluminum smelting, and the mixture is heated in a retort at 468° C. (875° F.) to remove water and light hydrocarbons. The process equipment includes a tire feed hopper, an oil feed system, variable-speed screw reactors with non-symmetrical tubes that are electrically heated, liquid receiver vessels, solid product receiver vessels, and glass and steel receiver vessels. A horizontal or vertical feed screw conveys the tires and oils to a first stage, primary screw reactor where the additives are injected and mixed and the tires are digested with the oils at 315° C. (600° F.) to 399° C. (750° F.). The tires are shredded in this stage and the separation of glass and steel from the rubber and other tire components is begun. Retorting continues in a second stage reactor, at process temperatures of 427° C. (800° F.) to 468° C. (875° F.). Volatile and light hydrocarbon components such as gases and liquids are collected and condensed, then stored or used as fuels for the process. A second horizontal reactor receives the carbonaceous residue from the first stage reactor and lowers the remaining oil content to below 1% at temperatures of 427° C. (800° F.) to 482° C. (900° F.). A claimed benefit to including the crushed mineral fillers in the reaction mixture is the elimination of hydrogen sulfide gas and the adsorbance of chlorinated compounds from the light oils collected. The use of carbonaceous residue rather than crushed limestone is claimed to: (1) improve the rheological properties of the asphalt; (2) improve binder aging; (3) increase the embrittlement of the asphalt binder; and (4) improve the force ductility at 4° C. (39.2° F.). When mixed with aggregates to produce hot mixes, binders containing the carbonaceous residue are claimed to: (1) increase the Marshall stability and lower the Marshall flow values, (2) improve the resilient modulus which indicated that these mixtures have higher load carrying capabilities with less tendency to rut; (3) show less tendency to rut in accelerated wheel rut testing with the Georgia loaded wheel tester; and (4) allow the mixtures to pass severe freeze-thaw moisture sensitivity testing with no failure for over 50 cycles, when most pavement mixtures without the carbonaceous additive failed in 8 cycles or less. The carbonaceous residue was also found to be of value as a Portland Cement additive after treatment with a surfactant.

A typical composition of granulated recycled tire rubber is as follows (all percents by weight):

| | |
|---|---|
| 63-64% | heavy oil and hydrocarbon resins |
| 6-7% | light oil |
| 21-22% | carbon black |
| 2-3% | inorganic mineral fillers |
| 1-2% | sulfur |
| 3-4% | polymers |

When granulated tire rubber is added directly to hot asphalt, the rubber begins to melt or decompose. In the decomposition, the polymer dissociates from the sulfur and begins to break apart into light hydrocarbon components, including light oils that are volatile and escape in gaseous form from the mixture over time. At temperatures approaching 200° C. (398° F.), the rate of escape increases considerably and these light components leave the mixture entirely. While the passage of these components is in progress, most asphalt-rubber mastics of the prior art undergo a transitional stage in which their properties are changing due to the gradual loss of these components. To take advantage of, or to fully accommodate, these transitional properties, the mastics must be used within two hours of their preparation. The two-hour window is less critical in mastics prepared by the procedures disclosed in the Flanigan patents above, however, in which the mixture of tire rubber granules and asphalt is heated to 260° C. (500° F.) using jet spray nozzles in a circulating reactor. This causes rapid volatilization of the light components but involves expensive equipment that requires substantial upkeep. In addition, without special treatments such as the coating of the rubber granules, the granules tend to separate from the asphalt, resulting in a lack of homogeneity.

SUMMARY OF THE INVENTION

It has now been discovered that recycled tire rubber can be incorporated in asphalt compositions without causing the compositions to go through a transitional phase after the incorporation, and without separation of the rubber particles from the asphalt, by a novel process that entails a preliminary heat treatment of the rubber particles prior to their incorporation into the liquid asphalt. The heat treatment causes polymeric components in the rubber to decompose to small molecules, such as for example styrene and butadiene, many of which flash off from the composition. The heat treatment causes volatile organic components in general of the tire rubber to escape, as well as moisture, but also results in a storage-stable tire-rubber/asphalt blend that does not require application within a short time following its preparation. In certain embodiments of the invention, the heat treatment is performed on a mixture of the tire rubber granules and carbonaceous waste solids from a petroleum refining operation or other industrial processes. The solids provide the benefit of enhancing the distribution of heat within the tire material, thereby improving the effectiveness of the heat treatment. In certain embodiments as well, oils and penetration reducing agents (known in the asphalt art as "low PEN" agents) are included, either in the preliminary heat treatment, the final combination of the heat treated material with the liquid asphalt, or both. Still further embodiments and variations will be apparent from the description that follows.

DETAILED DESCRIPTION OF THE INVENTION AND PREFERRED EMBODIMENTS

Recycled tire rubber for use in the present invention is tire-derived rubber that has not been devulcanized. Sources of the rubber include worn tires, tire scrap, inner tube scrap, retread scrap, tire peel, and tire carcasses. The rubber in these tires is primarily natural rubber (cis-polyisoprene), polybutadiene, styrene-butadiene rubber, or combinations of these rubbers. Other rubbers that may also be present are halobutyl rubber, isobutylene isoprene rubber, and ethylene-propylene rubber. Fillers such as carbon black are also commonly present, as are softeners, extenders, and plasticizers, in addition to sulfur as a vulcanizing agent. Used tires are preferably ground, screened, and otherwise treated to remove metal, cord, and fabric, although whole tire carcasses can also be ground and used without further treatment prior to the heat treatment discussed herein.

The recycled tires or tire pieces are preferably comminuted to sizes less than 10 mesh (Tyler sieve series), which corresponds to particles whose longest dimensions are a maximum of about 1 mm. Smaller size particles are even more preferred. To reduce the tires to these particle sizes, the tires can be subjected to mechanical grinding, optionally under cryogenic conditions or with the addition of solvents that cause the rubber to swell, to enhance grinding efficiency. Cryogenic conditions can be achieved by the use of liquid nitrogen or other cryogenic fluids to cool the rubber to a temperature below its glass transition temperature and thereby convert the rubber to a brittle form. Grinding can be performed in a two-roll grooved rubber mill which shears the tire sufficiently to tear it apart. Bead wire can be removed from the tires by hand or with magnets, and fiber can be removed by use of hammer mills, reel beaters, and air tables that blow a steady stream of air across the rubber to separate the fiber from the rubber.

In those embodiments of the invention in which the comminuted rubber particles are combined with other carbonaceous waste solids prior to the heat treatment, the waste solids can be those derived from sludges that accumulate in various units of a petroleum refinery operation. These sludges include, but are not limited to, API separator sludges, sludges from dissolved air flotation systems and induced air flotation systems, slop oil emulsion sludges, tank bottoms, sludges resulting from cleaning heat exchange bundles, crude oil storage tank sediments, clarified slurry oil tank sediments, sludges from in-line filters, and sludges from drainage ditches. A typical sludge will have a solids content in the range of about 1% to about 30%, with water, oil or both as the liquid component. The solids in these sludges contain both organic and inorganic material, and can include suspended carbonaceous matter as well as silt, sand, rust, and catalyst fines. The solids generally originate from the geological formations from which the petroleum was extracted, from deteriorating equipment or materials of construction used in the refinery, and from reagents used in the refining process that have become aggregated, polymerized, or otherwise solidified. Carbonaceous waste solids can be concentrated or extracted from sludges by centrifuge, filter presses, belt presses, vacuum filters, or other mechanical dewatering devices, many of which are used in refineries. Concentration by centrifuge can be achieved with known centrifuges such as a vertical disc centrifuge, a horizontal decanter centrifuge, a bowl centrifuge including both single-chamber and multi-chamber types, a tubular centrifuge, an ultracentrifuge, or a multi-phase combination centrifuge. Other carbonaceous waste solids that can be used include spent activated carbon, fines from a catalytic cracking operation, and fines from a petroleum coking operation. When carbonaceous waste solids are used, they are preferably at a particle size comparable to that of the tire rubber, i.e., with maximum longest dimensions of about 1 mm.

In embodiments in which the recycled tire rubber particles are combined with carbonaceous waste solids, the relative amounts can vary and are not critical to the invention. In most cases, best results will be obtained with a rubber-to-waste-solids ratio within the range of about 0.3:1 to about 5:1, and preferably about 0.5:1 to about 3:1.

The proportion of recycled tire rubber in the final asphalt blend can also vary. In most cases, best results will be obtained when the recycled tire rubber constitutes from about 3% to about 30% by weight of the blend, and preferably from about 5% to about 20% by weight of the blend.

In those embodiments in which an oil is added to the tire rubber particles, the oil can be any oil that is compatible, i.e., mixes well, with asphalt and that enhances the handling and application of asphalt. Examples are crude oil, a liquid petroleum fraction, motor oil, tall oil, agriculturally-derived oils (notably vegetable oils), and slurry oils, including both untreated oils as well as reclaimed or clarified.

The penetration reducing, or "low PEN," agents, when used, are incorporated to raise the softening point of the asphalt and to reduce the degree of penetration as determined by standard penetration tests, such as the needle penetration and cone penetration tests that are known in the art. Blended asphalts, prepared in accordance with the present invention, with needle penetration values of 100 dmm or less, are preferred. Conventional penetration reducing agents, such as elastomers, microcrystalline wax, and gilsonite, and others known in the art, can be used. Examples of suitable elastomers are styrenic block copolymers supplied by LCY Elastomers LP of Baytown, Tex., USA.

The heat treatment that the rubber particles are subjected to in the practice of this invention is an exposure of the particles to an elevated temperature for a sufficient period of time to cause the rubber particles and any other components in admixture with the particles during the treatment to undergo substantially no further change when later combined with the liquid asphalt in a mixture of substantially homogeneous consistency. In preferred embodiments of the invention, the temperature during the preliminary heat treatment is in the range of about 100° C. to about 260° C., particularly when the rubber particles are combined with carbonaceous waste solids prior to the treatment, and most preferably from about 115° C. to about 250° C. When the rubber particles are heat treated in the absence of carbonaceous waste solids, preferred temperatures are in the range of from about 204° C. to about 260° C., and most preferably in the range of from about 220° C. to about 250° C. The duration of the heat treatment can also vary. When the rubber particles are heated together with carbonaceous waste solids, best results will generally be achieved with a heat treatment that lasts from about 30 minutes to about 24 hours, although in preferred embodiments, the length of time is from about 30 minutes to about 5 hours. When the recycled tire rubber particles are heated without the carbonaceous waste solids, the preferred heating duration is from about 20 minutes to about 2 hours. With or without the presence of the carbonaceous waste solids, the heat treatment will generally result in the release of moisture, volatile organics, or both, and as such will cause a reduction of at least about 10% by weight in the material being heated, whether the material is the tire rubber particles alone or a mixture of the particles with the components listed above. The heat treatment can be done at or above atmospheric pressure or at subatmospheric pressures, and can be done either in air or in a non-oxidizing environment.

The blending of the heat-treated recycled tire rubber with liquid asphalt is preferably performed at an elevated temperature with high-shear mixing, both to improve the ease of mixing and the uniformity of the dispersion of the solid materials in the asphalt. Suitable temperatures can range from about 100° C. to about 300° C., preferably from about 100° C. to about 200° C., and high-shear mixing can be achieved by using conventional high-shear mixing equipment known in the art.

The following examples are offered as illustrations of various embodiments of the invention. All percents quoted in these examples are weight percents, and all parts are parts by weight, unless otherwise specified and except for the values of such parameters as resilience, elastic recovery, and tensile adhesion, that are expressed as percents. Percent values associated with these parameters have the meaning that they have in the art for these parameters.

Example 1

This example illustrates the heat treatment of a mixture of recycled tire rubber and waste solids from a crude oil refining operation, and the incorporation of the heat-treated mixture in an asphalt formulation. The waste solids in this example are centrifuge waste solids (CWS).

The following components were combined in the proportions shown:

| | |
|---|---|
| 55.0% | minus-20 mesh recycled tire rubber |
| 37.5% | damp CWS |
| 7.5% | reclaimed motor oil flux |

The mixture was heated in an oven at 115.6° C. (240° F.) for two hours. During this heating, the mixture lost 25% of its weight due to volatilization of moisture and light hydrocarbons. The mixture was then combined with dried CWS and other ingredients in the percents listed below and blended in a high-shear mixer:

| | |
|---|---|
| 48.6% | Frontier PG 64-22 petroleum asphalt |
| 19.2% | tall oil pitch |
| 2.5% | LCY elastomers 161-BP SBS polymer |
| 1.6% | LCY elastomers 6302 SBS polymer |
| 17.5% | heat-treated mixture above |
| 10.6% | additional (dried) CWS |

The resulting blend contained 12.8% minus-20 mesh recycled tire rubber and 14.3% dried CWS, both homogeneously dispersed throughout the remaining mixture. The properties of the blend were as follows:

| | |
|---|---|
| cone penetration at −18° C. (0° F.) | 3 dmm |
| cone penetration at 25° C. (77° F.) | 54 dmm |
| cone penetration at 50° C. (122° F.) | 136 dmm |
| softening point | 95.6° C. (204° F.) |
| flexibility at −18° C. (0° F.) | pass |
| flexibility at −28.9° C. (−20° F.) | fail |
| resilience at 25° C. (77° F.) | 46% |
| density | 1.107 g/cm$^3$ |
| viscosity at 193° C. (380° F.), V-73, 50 rpm | 2,247 cps |
| ductility at 4° C. (39.2° F.) | 47.5 cm |
| elastic recovery at 4° C. (39.2° F.) | 94.5% |
| force ductility at 4° C. (39.2° F.) | 50 cm |
| force pounds initial | 3.70 |
| force pounds at 30 cm | 3.63 |
| force pounds at peak | 5.90 |
| tensile adhesion at 25° C. (77° F.) | 700% |

These properties are comparable to a PG 100-28 recycled tire rubber/polymer modified asphalt binder.

Example 2

This example is a further illustration of the use of the heat-treated mixture of tire rubber, damp CWS, and reclaimed motor oil flux of Example 1 by incorporation of the mixture in an asphalt formulation.

The heat-treated mixture was combined with asphalt, tall oil pitch, and elastomers in the percents listed below and blended in a high-shear mixer:

| | |
|---|---|
| 54.4% | Valero PG 70-10 petroleum asphalt |
| 21.5% | tall oil pitch |
| 1.8% | LCY elastomers 161-BP SBS polymer |
| 2.8% | LCY elastomers 6302 SBS polymer |
| 19.5% | heat-treated tire rubber/CWS/motor oil flux mixture (Example 1) |

The resulting blend contained 10.7% minus-20 mesh recycled tire rubber and 7.3% dried CWS, both in homogeneous dispersion throughout the remainder of the mixture. The properties of this blend were as follows:

| | |
|---|---|
| cone penetration at −18° C. (0° F.) | 2 dmm |
| cone penetration at 25° C. (77° F.) | 64 dmm |
| cone penetration at 50° C. (122° F.) | 157 dmm |
| softening point | 97.8° C. (208° F.) |
| flexibility at −18° C. (0° F.) | fail |
| resilience at 25° C. (77° F.) | 27% |
| density | 1.0547 g/cm$^3$ |
| viscosity at 193° C. (380° F.), V-73, 50 rpm | 1,584 cps |
| viscosity at 160° C. (320° F.), V-73, 50 rpm | 2,825 cps |
| viscosity at 135° C. (275° F.), V-73, 50 rpm | 18,886 cps |
| ductility at 4° C. (39.2° F.) | 26 cm |
| elastic recovery at 4° C. (39.2° F.) | 82% |
| force ductility at 4° C. (39.2° F.) | 41.5 cm |
| force pounds initial | 11.6 |
| force pounds at 30 cm | 8.24 |
| force pounds at peak | 9.61 |
| tensile adhesion at 25° C. (77° F.) | 500% |

Example 3

This example is a still further illustration of the use of the heat-treated mixture of tire rubber, damp CWS, and reclaimed motor oil flux of Example 1 in an asphalt formulation.

The heat-treated mixture was combined with asphalt, dried CWS, naphthenic oil, and elastomers in the percents listed below and blended in a high-shear mixer:

| | |
|---|---|
| 48.6% | Frontier PG 64-22 petroleum asphalt |
| 19.2% | L-1200 naphthenic oil |
| 2.5% | LCY elastomers 161-BP SBS polymer |
| 1.6% | LCY elastomers 6302 SBS polymer |
| 17.5% | heat-treated tire rubber/CWS/motor oil flux mixture (Example 1) |
| 10% | dried CWS |

The resulting blend contained 9.6% minus-20 mesh recycled tire rubber and 17.2% dried CWS, both in homogeneous dispersion throughout the remainder of the mixture. The properties of this blend were as follows:

| | |
|---|---|
| cone penetration at −18° C. (0° F.) | 15 dmm |
| cone penetration at 25° C. (77° F.) | 107 dmm |
| cone penetration at 50° C. (122° F.) | 175 dmm |
| softening point | 92.2° C. (198° F.) |
| flexibility at −18° C. (0° F.) | pass |
| resilience at 25° C. (77° F.) | 56% |

-continued

| | |
|---|---|
| density | 1.094 g/cm³ |
| viscosity at 193° C. (380° F.), V-73, 50 rpm | 1,434 cps |
| viscosity at 160° C. (320° F.), V-73, 50 rpm | 5,418 cps |
| ductility at 4° C. (39.2° F.) | 67 cm |
| force ductility at 4° C. (39.2° F.) | 72 cm |
| force pounds initial | 0.93 |
| force pounds at 30 cm | 1.69 |
| force pounds at peak | 3.98 |
| tensile adhesion at 25° C. (77° F.) | 800+% |
| bond test, 50% extension at −28.9° C. (−20° F.) | passes three cycles |

This modified asphalt binder meets 1999 State of California specifications for Low Modulus Crack Sealant.

Example 4

This example is a still further illustration of the use of the heat-treated mixture of tire rubber, damp CWS, and reclaimed motor oil flux of Example 1 in an asphalt formulation.

The heat-treated mixture was combined with asphalt, Raffene oil, dried CWS, synthetic fiber, and elastomers in the percents listed below and blended in a high-shear mixer:

| | |
|---|---|
| 46.7% | Frontier PG 64-22 petroleum asphalt |
| 18.5% | Raffene 1200-L oil |
| 1.9% | LCY elastomers 6302 SBS polymer |
| 20.8% | heat-treated tire rubber/CWS/motor oil flux mixture (Example 1) |
| 10.2% | dried CWS |
| 1.9% | synthetic fiber |

The resulting blend contained 11.4% minus-20 mesh recycled tire rubber and 18.0% dried CWS, both in homogeneous dispersion throughout the remainder of the mixture. The properties of the blend were as follows:

| | |
|---|---|
| cone penetration at −18° C. (0° F.) | 15 dmm |
| cone penetration at 25° C. (77° F.) | 186 dmm |
| cone penetration at 50° C. (122° F.) | 291 dmm |
| softening point | 73.9° C. (165° F.) |
| resilience at 25° C. (77° F.) | −15% |
| viscosity at 193° C. (380° F.), V-73, 50 rpm | 920 cps |
| viscosity at 135° C. (275° F.), V-73, 50 rpm | 2,568 cps |
| ductility at 4° C. (39.2° F.) | 93 cm |
| force ductility at 4° C. (39.2° F.) | 94.5 cm |
| force pounds initial | 0.21 |
| force pounds at 30 cm | 0.53 |
| force pounds at peak | 0.83 |

This material is suitable as a warm mix or hot mix recycling agent.

Example 5

This example is a still further illustration of the use of the heat-treated mixture of tire rubber, damp CWS, and reclaimed motor oil flux of Example 1 in an asphalt formulation.

The heat-treated mixture was combined with asphalt and Raffene oil and blended in a high-shear mixer:

| | |
|---|---|
| 68.5% | Frontier PG 64-22 petroleum asphalt |
| 4.0% | Raffene L-1200 oil |
| 27.5% | heat-treated tire rubber/CWS/motor oil flux mixture (Example 1) |

The resulting blend contained 15.1% minus-20 mesh recycled tire rubber and 10.3% dried CWS, both in homogeneous dispersion throughout the remainder of the mixture. The properties of the blend were as follows:

| | |
|---|---|
| cone penetration at 25° C. (77° F.) | 193 dmm |
| cone penetration at 50° C. (122° F.) | 320 dmm |
| softening point | 36.7° C. (98° F.) |
| density at 25° C. (77° F.) | 1.0119 g/cm³ |
| ductility at 4° C. (39.2° F.) | 47 cm |
| force ductility at 4° C. (39.2° F.) | 56.5 cm |
| force pounds initial | 0.26 |
| force pounds at 30 cm | 0.01 |
| force pounds at peak | 0.26 |

This material had the consistency of taffy and is useful as a warm or hot mix recycling agent.

Example 6

This example illustrates the heat treatment of a mixture of recycled tire rubber and CWS in proportions different from those of Example 1 and at a higher temperature. The components were combined in the proportions listed below:

| | |
|---|---|
| 55% | minus-20 mesh recycled tire rubber |
| 30% | damp CWS |
| 15% | Raffene L-1200 oil |

The mixture was heated at 148.9° C. (300° F.) for 3 hours, causing the mixture to lose 30% of its weight. The mixture was then combined with petroleum asphalt, oil, elastomers, and sulfur in the percents listed below and blended in a high-shear mixer:

| | |
|---|---|
| 66.3% | Frontier PG 64-22 petroleum asphalt |
| 3.9% | Raffene L-1200 oil |
| 3.0% | LCY elastomers 161-BP SBS polymer |
| 0.1% | sulfur |
| 26.7% | heat-treated mixture above |

The resulting blend contained 20.0% minus-20 mesh recycled tire rubber and 4.6% dried CWS, both in homogeneous dispersion throughout the remainder of the mixture. The properties of this blend were as follows:

| | |
|---|---|
| cone penetration at −18° C. (0° F.) | 7 dmm |
| cone penetration at 25° C. (77° F.) | 93 dmm |
| cone penetration at 50° C. (122° F.) | 221 dmm |
| softening point | 88.9° C. (192° F.) |
| flexibility at −18° C. (0° F.) | pass |
| flexibility at −28.9° C. (−20° F.) | fail |

-continued

| | |
|---|---|
| resilience at 25° C. (77° F.) | 26% |
| density | 1.109 g/cm³ |
| viscosity at 193° C. (380° F.), V-73, 50 rpm | 1,359 cps |
| viscosity at 135° C. (275° F.), V-73, 50 rpm | 10,750 cps |
| ductility at 4° C. (39.2° F.) | 66 cm |
| elastic recovery at 4° C. (39.2° F.) | 89.2% |
| force ductility at 4° C. (39.2° F.) | 69.5 cm |
| force pounds initial | 1.02 |
| force pounds at 30 cm | 1.51 |
| force pounds at peak | 2.79 |
| bond test at −28.9° C. (−20° F.) | fail |

These properties qualify the composition as an ASTM D 6690 Type I Crack Sealant.

Example 7

The materials of Example 6 were used, in the same proportions and with the same procedures, except that LCY Elastomers 6302 SBS polymer was used in place of LCY Elastomers 161-BP SBS polymer. The properties of the resulting blend were as follows:

| | |
|---|---|
| cone penetration at 25° C. (77° F.) | 58 dmm |
| cone penetration at 50° C. (122° F.) | 196 dmm |
| softening point | 82.8° C. (181° F.) |
| flexibility at −18° C. (0° F.) | fail |
| resilience at 25° C. (77° F.) | 24% |
| density | 1.095 g/cm³ |
| viscosity at 193° C. (380° F.), V-73, 50 rpm | 1,157 cps |
| viscosity at 135° C. (275° F.), V-73, 50 rpm | 5,799 cps |
| ductility at 4° C. (39.2° F.) | 30 cm |
| force ductility at 4° C. (39.2° F.) | 32 cm |
| force pounds initial | 4.03 |
| force pounds at 30 cm | 2.87 |
| force pounds at peak | 4.03 |
| bond test at −28.9° C. (−20° F.) | fail |

With these properties, the product is useful as a PG 88-28 asphalt binder.

Example 8

The materials of Example 6 were used, in the same proportions and with the same procedures, except that LCY Elastomers 6320 SBS polymer was used in place of LCY Elastomers 161-BP SBS polymer. The properties of the resulting blend were as follows:

| | |
|---|---|
| cone penetration at 25° C. (77° F.) | 69 dmm |
| cone penetration at 50° C. (122° F.) | 218 dmm |
| softening point | 66.1° C. (151° F.) |
| flexibility at −18° C. (0° F.) | fail |
| resilience at 25° C. (77° F.) | 18% |
| density | 1.084 g/cm³ |
| viscosity at 193° C. (380° F.), V-73, 50 rpm | 2,718 cps |
| viscosity at 135° C. (275° F.), V-73, 50 rpm | 4,526 cps |
| ductility at 4° C. (39.2° F.) | 33 cm |
| force ductility at 4° C. (39.2° F.) | 37 cm |
| force pounds initial | 6.16 |
| force pounds at 30 cm | 3.18 |
| force pounds at peak | 6.16 |
| bond test at −28.9° C. (−20° F.) | fail |

With these properties, the product is useful as a PG 76-22 asphalt binder.

Example 9

This example is a further illustration of the use of the heat-treated mixture of tire rubber, damp CWS, and Raffene L-1200 oil of Example 6 in an asphalt formulation.

The heat-treated mixture was combined with asphalt, further Raffene oil, elastomers, and damp CWS in the following proportions, and blended in a high-shear mixer:

| | |
|---|---|
| 49.0% | Frontier PG 64-22 petroleum asphalt |
| 19.0% | Raffene L-1200 oil |
| 4.0% | 161-BP LCY Elastomers SBS polymer |
| 17.5% | heat-treated tire rubber/CWS/Raffene oil mixture (Example 6) |
| 10.5% | dried CWS |

The resulting blend contained 9.6% minus-20 mesh recycled tire rubber and 15.8% dried CWS, both in homogeneous dispersion throughout the remaining mixture. The properties of the blend were as follows:

| | |
|---|---|
| cone penetration at −18° C. (0° F.) | 19 dmm |
| cone penetration at 25° C. (77° F.) | 139 dmm |
| cone penetration at 50° C. (122° F.) | 208 dmm |
| softening point | 88.9° C. (192° F.) |
| flexibility at −28.9° C. (−20° F.) | pass |
| density at 25° C. (77° F.) | 1.0873 g/cm³ |
| ductility at 25° C. (77° F.) | 63 cm |
| viscosity at 193° C. (380° F.), V-73, 50 rpm | 1,519 cps |
| ductility at 4° C. (39.2° F.) | 83.5 cm |
| elastic recovery at 4° C. (39.2° F.) | 97.16% |
| force ductility at 4° C. (39.2° F.) | 88.0 cm |
| force pounds initial | 0.18 |
| force pounds at 30 cm | 0.87 |
| force pounds at peak | 3.98 |
| bond test, 50% extension, −28.9° C. (−20° F.) | pass |

This material meets the specifications for ASTM D 6690, Type III, and ASTM 3405 Cold Climate Crack Sealants, with the exception of cone penetration at 25° C. (77° F.).

Example 10

This example is a still further illustration of the use of the heat-treated mixture of tire rubber, damp CWS, and Raffene L-1200 oil of Example 6 in an asphalt formulation.

The heat-treated mixture was combined with asphalt, further Raffene oil, and elastomers, in the following proportions, and blended in a high-shear mixer:

| | |
|---|---|
| 49.0% | Frontier PG 64-22 petroleum asphalt |
| 19.0% | Raffene L-1200 oil |
| 4.0% | 161-BP LCY Elastomers SBS polymer |
| 28.0% | heat-treated tire rubber/CWS/Raffene oil mixture (Example 6) |

The resulting blend contained 9.6% minus-20 mesh recycled tire rubber and 15.8% dried CWS, both in homogeneous dispersion throughout the remainder of the mixture. The properties of the blend were as follows:

| | |
|---|---|
| cone penetration at −18° C. (0° F.) | 14 dmm |
| cone penetration at 25° C. (77° F.) | 105 dmm |
| cone penetration at 50° C. (122° F.) | 163 dmm |
| softening point | 95.6° C. (204° F.) |
| flexibility at −28.9° C. (−20° F.) | pass |
| resilience at 25° C. (77° F.) | 61% |
| viscosity at 193° C. (380° F.), V-73, 50 rpm | 2,857 cps |
| viscosity at 190° C. (374° F.), V-73, 50 rpm | 3,039 cps |
| ductility at 4° C. (39.2° F.) | 64 cm |
| elastic recovery at 4° C. (39.2° F.) | 94.8% |
| force ductility at 4° C. (39.2° F.) | 67.5 cm |
| force pounds initial | 0.37 |
| force pounds at 30 cm | 1.60 |
| force pounds at peak | 3.63 |
| tensile adhesion at 25° C. (77° F.) | 500% |
| bond test, 50% extension, −28.9° C. (−20° F.) | pass |

This material meets the specifications for ASTM D 6690, Type III, and ASTM 3405 Cold Climate Crack Sealants, with the exception of cone penetration at 25° C. (77° F.).

Example 11

This example uses recycled tire rubber of a smaller particle size than the preceding examples, in combination with CWS in different proportions and treated at a higher temperature.

One part minus-30 mesh tire rubber was combined with two parts damp CWS and the resulting mixture heated at 176.7° C. (350° F.) for one hour. Further dried CWS was added to achieve a final mixture of 33% minus-30 mesh tire rubber and 67% dried CWS. The mixture was then combined with asphalt, oil, and elastomers, in the percents listed below and blended in a high-shear mixer:

| | |
|---|---|
| 62.0% | San Joaquin Refining AR-8000 asphalt |
| 10.0% | San Joaquin Refining 1200-L oil |
| 4.0% | 161-BP LCY elastomers SBS polymer |
| 24.0% | heat-treated mixture above |

The resulting blend contained 4.8% minus-30 mesh recycled tire rubber and 19.2% dried CWS, both in homogeneous dispersion throughout the remainder of the mixture. The properties of this blend were as follows:

| | |
|---|---|
| density at 25° C. (77° F.) | 1.0741 g/cm³ |
| lb/gal at 25° C. (77° F.) | 8.952 |
| cone penetration at 25° C. (77° F.) | 114 dmm |
| cone penetration at 50° C. (122° F.) | 236 dmm |
| resilience at 25° C. (77° F.) | 36% |
| softening point | 84° C. (183° F.) |
| flexibility at −18° C. (0° F.) | pass |
| approximate ductility at 25° C. (77° F.) | 134 cm |

Example 12

This example is a further illustration of the use of the heat-treated mixture of −30 mesh tire rubber and CWS of Example 11 in an asphalt formulation.

The heat-treated mixture was combined with asphalt, motor oil flux, polymer, and phosphoric acid, in the percents listed below and blended in a high-shear mixer:

| | |
|---|---|
| 58.0% | San Joaquin Refining PG 70-10 petroleum asphalt |
| 16.0% | reclaimed motor oil flux |
| 1.9% | Elvaloy AM EVA polymer |
| 0.1% | phosphoric acid |
| 24.0% | heat-treated tire rubber/CWS mixture (Example 11) |

The resulting blend contained 7.9% minus-30 mesh recycled tire rubber and 16.1% dried CWS, both in homogeneous dispersion throughout the remainder of the mixture. The properties of this blend were as follows:

| | |
|---|---|
| density at 25° C. (77° F.) | 1.0635 g/cm³ |
| lb/gal at 25° C. (77° F.) | 8.864 |
| viscosity at 190° C. (374° F.), V-73, 50 rpm | 1,970 cps |
| cone penetration at 25° C. (77° F.) | 91 dmm |
| resilience at 25° C. (77° F.) | 25% |
| softening point | 64° C. (147° F.) |
| flexibility at −18° C. (0° F.) | fail |
| approximate ductility at 25° C. (77° F.) | 32 cm |
| approximate elastic recovery | 48% |

Example 13

This example is a further illustration of the use of a heat-treated mixture of minus-30 mesh tire rubber and CWS, this time with slurry oil residue.

The following components were combined in the percents listed below:

| | |
|---|---|
| 42.3% | minus-30 mesh tire rubber |
| 56.2% | damp CWS |
| 11.5% | clarified slurry oil residue |

The mixture was heated at 232° C. (450° F.) for one hour, resulting in a mixture containing:

| | |
|---|---|
| 58.7% | minus-30 mesh tire rubber |
| 25.4% | dry CWS |
| 15.9% | clarified slurry oil residue |

The heat-treated mixture was combined with asphalt, further slurry oil, and elastomers, in the percents listed below and blended in a high-shear mixer:

| | |
|---|---|
| 62.0% | Valero AR-8000 petroleum asphalt |
| 5.0% | Valero clarified slurry oil residue |
| 3.0% | LCY elastomers 161-BP SBS polymer |
| 30.0% | heat-treated tire rubber/CWS mixture above |

The resulting blend contained 17.6% minus-30 mesh recycled tire rubber and 7.6% dried CWS, both in homogeneous dispersion throughout the remainder of the mixture. The properties of the blend were as follows:

| | |
|---|---|
| density at 25° C. (77° F.) | 1.1167 g/cm³ |
| lb/gal at 25° C. (77° F.) | 9.307 |

-continued

| | |
|---|---|
| viscosity at 190° C. (374° F.), V-73, 50 rpm | 1,840 cps |
| softening point | 80° C. (176° F.) |
| cone penetration at 25° C. (77° F.) | 29 dmm |
| resilience at 25° C. (77° F.) | 29% |
| approximate ductility at 25° C. (77° F.) | 127 cm |
| elastic recovery at 25° C. (77° F.) | 74% |
| flexibility at −18° C. (0° F.) | fail |

Example 14

This example is a further illustration of the use of a heat-treated mixture of minus-30 mesh tire rubber and CWS.

The following components were combined in the percents listed below:

| | |
|---|---|
| 55.00% | minus-30 mesh tire rubber |
| 30.05% | dried CWS |
| 14.95% | Raffene 1200-L oil |

The mixture was heated at 232° C. (450° F.) for two hours, then allowed to cool to ambient temperature, then combined with asphalt, further oil, and elastomers, in the percents listed below and blended in a high-shear mixer:

| | |
|---|---|
| 49.0% | Valero PG 64-22 petroleum asphalt |
| 19.0% | Raffene 1200-L oil |
| 4.0% | LCY elastomers 161-BP SBS polymer |
| 28.0% | heat-treated tire rubber/CWS mixture above |

The resulting blend contained 15.4% minus-30 mesh recycled tire rubber and 8.4% dried CWS, both in homogeneous dispersion throughout the remainder of the mixture. The properties of this blend were as follows:

| | |
|---|---|
| density at 25° C. (77° F.) | 1.0734 g/cm$^3$ |
| lb/gal at 25° C. (77° F.) | 8.947 |
| viscosity at 190° C. (374° F.), V-73, 50 rpm | 888 cps |
| softening point | 87.2° C. (189° F.) |
| cone penetration at 25° C. (77° F.) | 62 dmm |
| resilience at 25° C. (77° F.) | 51% |
| flexibility at −18° C. (0° F.) | pass |
| ductility at 25° C. (77° F.) | 55 cm |
| elastic recovery at 25° C. (77° F.) | 97.5% |

The blend meets specifications for ASTM D 6690, Type I Crack Filler.

Example 15

This example is a further illustration of the use of the heat-treated mixture of minus-30 mesh tire rubber and CWS of Example 13.

After heating and cooling, the mixture was combined with asphalt and further slurry oil, in the percents listed below and blended in a high-shear mixer:

| | |
|---|---|
| 61.49% | Valero AR-8000 petroleum asphalt |
| 19.0% | Valero clarified slurry oil residue |
| 28.0% | heat-treated tire rubber/CWS mixture (Example 13) |

The resulting blend contained 19.83% minus-30 mesh recycled tire rubber and 8.58% dried CWS, both in homogeneous dispersion throughout the remainder of the mixture. The properties of this blend were as follows:

| | |
|---|---|
| density at 25° C. (77° F.) | 1.1209 g/cm$^3$ |
| lb/gal at 25° C. (77° F.) | 9.343 |
| viscosity at 190° C. (374° F.), V-73, 50 rpm | 910 cps |
| softening point | 58° C. (136.4° F.) |
| cone penetration at 25° C. (77° F.) | 61 dmm |
| resilience at 25° C. (77° F.) | 4% |
| approximate ductility at 25° C. (77° F.) | 74 cm |
| elastic recovery at 25° C. (77° F.) | 17% |

Example 16

This example illustrates the use of a mixture of tire rubber and CWS that has been milled to a smaller particle size prior to heat treatment.

A mixture of equal parts of minus-30 mesh tire rubber and damp CWS was milled in a ball mill containing 2.5-pound steel balls for three hours at ambient temperature. The mixture was then heated at 232° C. (450° F.) for one hour, then allowed to cool to ambient temperature, resulting in a weight loss of 45.5%. The final composition was 68.73% minus-30 mesh tire rubber and 31.27% dry CWS. This mixture was combined with asphalt, oil, and elastomers in the percents listed below and blended in a high-shear mixer:

| | |
|---|---|
| 61.0% | Valero AR-8000 petroleum asphalt |
| 6.0% | reclaimed motor oil flux |
| 3.0% | LCY Elastomers 161-BP SBS polymer |
| 30.0% | milled and heat-treated tire rubber/CWS mixture above |

The resulting blend contained 20.6% minus-30 mesh recycled tire rubber and 9.4% dried CWS, both in homogeneous dispersion throughout the remainder of the mixture. The properties of this blend were as follows:

| | |
|---|---|
| density at 25° C. (77° F.) | 1.1583 g/cm$^3$ |
| lb/gal at 25° C. (77° F.) | 9.654 |
| viscosity at 190° C. (374° F.), V-73, 50 rpm | 1,367 cps |
| viscosity at 165° C. (329° F.), V-73, 50 rpm | 2,568 cps |
| softening point | 82° C. (179.6° F.) |
| cone penetration at 25° C. (77° F.) | 44 dmm |
| resilience at 25° C. (77° F.) | 44% |
| flexibility at −18° C. (0° F.) | fail |
| approximate ductility at 25° C. (77° F.) | 150+ cm |
| elastic recovery at 25° C. (77° F.) | 72% |

This blend meets and exceeds the State of California specifications for asphalt-rubber pavement binder mixtures. The blend was tank stable, with light-to-moderate agitation for up to five days at 165° C. (329° F.) to 190° C. (374° F.).

Example 17

This example illustrates a still further formulation of minus-30 tire rubber and CWS.

The following components were combined in the percents listed below:

| | |
|---|---|
| 44.0% | minus-30 mesh tire rubber |
| 44.0% | damp CWS |
| 12.0% | reclaimed motor oil flux |

The mixture was heated at 232° C. (450° F.) for two hours, then cooled, resulting in a mixture containing:

| | |
|---|---|
| 56.4% | minus-30 mesh tire rubber |
| 28.2% | dry CWS |
| 15.4% | reclaimed motor oil flux |

This blend was combined with asphalt, oil, and elastomers in the percents listed below and blended in a high-shear mixer:

| | |
|---|---|
| 57.0% | Valero PG 64-22 petroleum asphalt |
| 8.0% | reclaimed motor oil flux |
| 3.0% | LCY Elastomers 161-BP SBS polymer |
| 32.0% | heat-treated tire rubber/CWS mixture above |

The resulting blend contained 18.1% minus-30 mesh recycled tire rubber and 9.0% dried CWS, both in homogeneous dispersion throughout the remainder of the mixture. The properties of this blend were as follows:

| | |
|---|---|
| density at 25° C. (77° F.) | 1.0761 g/cm³ |
| lb/gal at 25° C. (77° F.) | 8.693 |
| viscosity at 190° C. (374° F.), V-73, 50 rpm | 3,837 cps |
| softening point | 92.8° C. (199° F.) |
| cone penetration at 25° C. (77° F.) | 63 dmm |
| resilience at 25° C. (77° F.) | 49% |
| flexibility at −18° C. (0° F.) | pass |
| ductility at 25° C. (77° F.) | 24.5 cm |
| elastic recovery at 25° C. (77° F.) | 96.25% |
| COC flash point | 250° C. (482° F.) |

This blend meets and exceeds the State of California specifications for asphalt-rubber binders for semi-open graded pavement, and also meets specifications for ASTM D 6690, Type I Crack Filler.

Example 18

This example is a further illustration of the use of the heat-treated mixture of minus-30 mesh tire rubber and CWS of Example 11.

After heating and cooling, the mixture was combined with asphalt, reclaimed motor oil flux, and elastomers, in the percents listed below, and blended in a high-shear mixer:

| | |
|---|---|
| 60.0% | Shell-Martinez PG 70-10 asphalt |
| 5.0% | reclaimed motor oil flux |
| 3.0% | LCY elastomers 161-BP SBS polymer |
| 32.0% | heat-treated tire rubber/CWS mixture (Example 11) |

The resulting blend contained 10.6% minus-30 mesh recycled tire rubber and 21.4% dry CWS, both in homogeneous dispersion throughout the remainder of the mixture. The properties of this blend were as follows:

| | |
|---|---|
| density at 25° C. (77° F.) | 1.0988 g/cm³ |
| lb/gal at 25° C. (77° F.) | 9.158 |
| viscosity at 190° C. (374° F.), V-73, 50 rpm | 5,489 cps |
| softening point | 95° C. (203° F.) |
| cone penetration at 25° C. (77° F.) | 54 dmm |
| resilience at 25° C. (77° F.) | 45% |
| flexibility at −18° C. (0° F.) | pass |
| approximate ductility at 25° C. (77° F.) | 122 cm |
| elastic recovery at 25° C. (77° F.) | 82% |

This blend meets specifications for ASTM D 6690, Type I Hot Applied Crack Sealant and ASTM 6297 Asphaltic Plug Joint for Bridges.

Example 19

This example illustrates the use of activated carbon instead of the centrifuge waste solids of the preceding examples, but otherwise similarly combined with tire rubber.

Equal parts of minus-30 mesh tire rubber and pulverized activated carbon were combined and heated at 232° C. (450° F.) for one hour, then cooled to ambient temperature. The heating caused the mixture to lose 20% of its weight, resulting in a mixture containing 62.5% minus-30 mesh recycled tire rubber and 32.5% pulverized and dried activated carbon. This blend was combined with asphalt, oil, and elastomers in the percents listed below and blended in a high-shear mixer:

| | |
|---|---|
| 60.0% | Shell PG 64-22 petroleum asphalt |
| 5.0% | reclaimed motor oil flux |
| 3.0% | LCY Elastomers 161-BP SBS polymer |
| 32.0% | heat-treated tire rubber/activated carbon mixture above |

The resulting blend contained 20.0% minus-30 mesh recycled tire rubber and 12.0% activated carbon, both in homogeneous dispersion throughout the remainder of the mixture. The properties of this blend were as follows:

| | |
|---|---|
| density at 25° C. (77° F.) | 1.0714 g/cm³ |
| lb/gal at 25° C. (77° F.) | 8.930 |
| viscosity at 190° C. (374° F.), V-73, 50 rpm | 1,756 cps |
| viscosity at 165° C. (329° F.), V-73, 50 rpm | 2,638 cps |
| softening point | 96° C. (204.8° F.) |
| cone penetration at 25° C. (77° F.) | 62 dmm |
| resilience at 25° C. (77° F.) | 38% |
| flexibility at −18° C. (0° F.) | fail |
| approximate ductility at 25° C. (77° F.) | 138 cm |
| elastic recovery at 25° C. (77° F.) | 86.4% |

This asphalt-rubber mastic meets the State of California requirements of a minimum of 18% recycled tire rubber for an asphalt-rubber binder suitable for use in asphalt pavement, construction, and as a hot-applied chip seal binder for asphalt pavement maintenance.

Example 20

This example illustrates the use of petroleum coke fines instead of the centrifuge waste solids and activated carbon of the preceding examples, but otherwise similarly combined with tire rubber.

The following components were combined in the percents listed below:

| | |
|---|---|
| 54.1% | cryogenically ground minus-30 mesh tire rubber |
| 32.4% | minus-80 mesh petroleum coke fines |
| 13.5% | reclaimed motor oil flux |

The mixture was heated at 232° C. (450° F.) for one hour, then cooled, and combined with asphalt and elastomers in the percents listed below and blended in a high-shear mixer:

| | |
|---|---|
| 60.0% | Shell PG 64-22 petroleum asphalt |
| 3.0% | LCY Elastomers 161-BP SBS polymer |
| 37.0% | heat-treated tire rubber/coke fines mixture above |

The resulting blend contained 20.0% minus-30 mesh recycled tire rubber and 12.0% minus-80 mesh coke fines, both in homogeneous dispersion throughout the remainder of the mixture. The properties of this blend were as follows:

| | |
|---|---|
| density at 25° C. (77° F.) | 1.0348 g/cm$^3$ |
| lb/gal at 25° C. (77° F.) | 8.625 |
| viscosity at 190° C. (374° F.), V-73, 50 rpm | 1,486 cps |
| viscosity at 165° C. (329° F.), V-73, 50 rpm | 4,715 cps |
| softening point | 95° C. (203° F.) |
| cone penetration at 25° C. (77° F.) | 80 dmm |
| resilience at 25° C. (77° F.) | 55% |
| flexibility at −12° C. (10° F.) | pass |
| flexibility at −18° C. (0° F.) | fail |
| approximate ductility at 25° C. (77° F.) | 150+ cm |
| elastic recovery at 25° C. (77° F.) | 87.9% |

This asphalt-rubber mastic meets the State of California requirements of a minimum of 18% recycled tire rubber for an asphalt-rubber binder suitable for use in asphalt pavement, construction, and as a hot-applied chip seal binder for asphalt pavement maintenance.

Example 21

This example illustrates the use of tire rubber and centrifuge waste solids as in the first several examples above, but with a higher proportion of tire rubber.

A mixture containing 90% minus-30 mesh recycled tire rubber and 10.0% damp CWS was heated at 232° C. (450° F.) for one hour, then cooled. Separately, a modified asphalt was prepared with the following ingredients by blending at 177° C. (350° F.) with a high-shear mixer:

| | |
|---|---|
| 96.0% | PG 70-10 petroleum asphalt |
| 1.0% | reclaimed motor oil flux |
| 3.0% | LCY Elastomers 161-BP SBS polymer |

The heat-treated rubber/CWS was added to the modified asphalt and blended with high-shear mixing at 135° C. (275° F.). The final blend consisted of:

| | |
|---|---|
| 88.800% | PG 70-10 petroleum asphalt |
| 0.925% | reclaimed motor oil flux |
| 2.775% | LCY Elastomers 161-BP SBS polymer |
| 0.450% | dry CWS |
| 4.878% | oil and resin from the tire rubber |
| 1.784% | carbon black from the tire rubber |
| 0.233% | inorganic fillers from the tire rubber |
| 0.155% | sulfur from the tire rubber |

The properties of this blend were as follows:

| | |
|---|---|
| density at 25° C. (77° F.) | 1.0189 g/cm$^3$ |
| lb/gal at 25° C. (77° F.) | 8.492 |
| viscosity at 190° C. (374° F.), V-73, 50 rpm | 666 cps |
| viscosity at 165° C. (329° F.), V-73, 50 rpm | 3,308 cps |
| softening point | 61° C. (141.8° F.) |
| cone penetration at 25° C. (77° F.) | 32 dmm |
| resilience at 25° C. (77° F.) | 14% |
| ductility at 25° C. (77° F.) | 150+ cm |
| elastic recovery at 25° C. (77° F.) | 75.7% |
| insoluble matter, ASTM D 5546 | 2.097% |

This asphalt-rubber binder is expected to meet the proposed State of California specifications for PG-TR 76-22 Tire Rubber Modifier Binder.

Example 22

This example uses the materials and procedures of Example 21 with the addition of the elastomers and the motor oil flux to the tire rubber/CWS mixture after the latter had been heated and cooled to ambient temperature, to form an additive having the following composition:

| | |
|---|---|
| 67.0% | heat-treated tire rubber/CWS mixture |
| 64.7% | SBS polymer |
| 8.3% | reclaimed motor oil flux |

This additive was combined with PG 70-10 petroleum asphalt in the proportion of 12.2% additive to 88.8% asphalt, to form a final blend with the same composition as that of Example 21. The properties of this blend were as follows:

| | |
|---|---|
| density at 25° C. (77° F.) | 1.0187 g/m$^3$ |
| lb/gal at 25° C. (77° F.) | 8.490 |
| viscosity at 190° C. (374° F.), V-73, 50 rpm | 668 cps |
| viscosity at 165° C. (329° F.), V-73, 50 rpm | 3,324 cps |
| softening point | 61° C. (141.8° F.) |
| cone penetration at 25° C. (77° F.) | 31 dmm |
| resilience at 25° C. (77° F.) | 14% |
| ductility at 25° C. (77° F.) | 150+ cm |
| elastic recovery at 25° C. (77° F.) | 76% |
| insoluble matter, ASTM D 5546 | 2.467% |

These properties are essentially identical to those of the blend of Example 21.

Example 23

This example illustrates the heat treatment of particles of recycled tire rubber alone, rather than being in an admixture with centrifuge waste solids, pulverized activated carbon, or petroleum coke fines, and the addition of the heat-treated tire rubber to asphalt together with elastomers and an oil. The approximate composition of the recycled tire rubber before the heat treatment was as follows:

| | |
|---|---|
| 63-64% | heavy oil and hydrocarbon resins |
| 6-7% | light oil |
| 21-22% | carbon black |
| 2-3% | inorganic mineral fillers |
| 1-2% | sulfur |
| 3-4% | polymers |

The tire rubber, comminuted to minus-30 mesh, was heated at 232° C. (450° F.) for one hour, then cooled to ambient temperature, the heat treatment causing a weight loss of 20%. The approximate composition of the tire rubber after the heat treatment was as follows:

| | |
|---|---|
| 68.0% | heavy oil and hydrocarbon resins |
| 27.0% | carbon black |
| 3.0% | inorganic mineral fillers |
| 2.0% | sulfur |

The heat-treated tire rubber was then combined with elastomers and motor oil flux in the following proportions:

| | |
|---|---|
| 64.29% | heat-treated tire rubber |
| 19.28% | LCY 161-BP elastomers SBS polymer |
| 16.43% | reclaimed motor oil flux |

This mixture was then added to PG 10-70 petroleum asphalt with high-shear mixing at 135° C. (275° F.) to 176° C. (350° F.) to form an asphalt mastic whose composition was as follows:

| | |
|---|---|
| 86.00% | PG 70-10 petroleum asphalt |
| 2.30% | reclaimed motor oil flux |
| 2.70% | LCY Elastomers 161-BP SBS polymer |
| 6.11% | heavy oil and hydrocarbon resin |
| 2.44% | carbon black |
| 0.27% | inorganic fillers |
| 0.18% | sulfur |

The properties of this blend were as follows:

| | |
|---|---|
| density at 25° C. (77° F.) | 1.0583 g/cm³ |
| lb/gal at 25° C. (77° F.) | 8.821 |
| viscosity at 190° C. (374° F.), V-73, 50 rpm | 619 cps |
| viscosity at 165° C. (329° F.), V-73, 50 rpm | 5,973 cps |
| softening point | 66° C. (150.8° F.) |
| needle penetration at 25° C. (77° F.) | 49 dmm |
| cone penetration at 25° C. (77° F.) | 49 dmm |
| resilience at 25° C. (77° F.) | 7% |
| flexibility at −18° C. (0° F.) | barely pass |
| ductility at 25° C. (77° F.) | 150+ cm |
| elastic recovery at 25° C. (77° F.) | 88% |
| insoluble matter, ASTM D 5546 | 2.30% |

Example 24

The materials of Example 23 were used in the same proportions and according to the same procedures except for the substitution of PG 64-10 petroleum asphalt for the PG 70-10 asphalt of Example 23. The resulting asphalt mastic composition had the following properties;

| | |
|---|---|
| density at 25° C. (77° F.) | 1.001 g/cm³ |
| lb/gal at 25° C. (77° F.) | 8.34 |
| viscosity at 190° C. (374° F.), V-73, 50 rpm | 535 cps |
| viscosity at 165° C. (329° F.), V-73, 50 rpm | 3,456 cps |
| softening point | 64° C. (147.2° F.) |
| needle penetration at 25° C. (77° F.) | 65 dmm |
| cone penetration at 25° C. (77° F.) | 57 dmm |
| resilience at 25° C. (77° F.) | 15% |
| flexibility at −18° C. (0° F.) | fail |
| ductility at 25° C. (77° F.) | 150+ cm |
| elastic recovery at 25° C. (77° F.) | 72.86% |
| insoluble matter, ASTM D 5546 | 2.24% |

This blend is expected to comply with specifications for a PG-70-22 asphalt mastic.

Example 25

The materials of Example 23 were used in the same proportions and according to the same procedures except for the substitution of PG 58-22 petroleum asphalt for the PG 70-10 asphalt of Example 23. The resulting asphalt mastic composition had the following properties;

| | |
|---|---|
| density at 25° C. (77° F.) | 1.001 g/cm³ |
| lb/gal at 25° C. (77° F.) | 8.34 |
| viscosity at 190° C. (374° F.), V-73, 50 rpm | 392 cps |
| viscosity at 165° C. (329° F.), V-73, 50 rpm | 3,127 cps |
| softening point | 57° C. (134.6° F.) |
| needle penetration at 25° C. (77° F.) | 80 dmm |
| cone penetration at 25° C. (77° F.) | 75 dmm |
| resilience at 25° C. (77° F.) | 4% |
| flexibility at −18° C. (0° F.) | fail |
| ductility at 25° C. (77° F.) | 150+ cm |
| elastic recovery at 25° C. (77° F.) | 71.4% |
| insoluble matter, ASTM D 5546 | 2.24% |

This blend is expected to comply with specifications for a PG-70-22 asphalt mastic.

Example 26

The heat-treated tire rubber of Example 23 was combined with elastomers and motor oil flux in the following proportions:

| | |
|---|---|
| 58.1% | heat-treated tire rubber |
| 25.8% | LCY 161-BP elastomers SBS polymer |
| 16.1% | reclaimed motor oil flux |

The resulting mixture was then added to PG 58-22 petroleum asphalt at a proportion of 84.5% asphalt and 15.5% rubber/elastomer/oil mixture, with high-shear mixing at 135° C. (275° F.) to 176° C. (350° F.) to form an asphalt mastic whose composition was as follows:

| | |
|---|---|
| 84.50% | PG 58-22 petroleum asphalt |
| 2.50% | reclaimed motor oil flux |
| 4.00% | LCY Elastomers 161-BP SBS polymer |
| 6.12% | heavy oil and hydrocarbon resin |
| 2.43% | carbon black |
| 0.27% | inorganic fillers |
| 0.18% | sulfur |

The properties of this mastic were as follows:

| | |
|---|---|
| density at 25° C. (77° F.) | 1.0154 g/cm$^3$ |
| lb/gal at 25° C. (77° F.) | 8.463 |
| viscosity at 190° C. (374° F.), V-73, 50 rpm | 512 cps |
| viscosity at 165° C. (329° F.), V-73, 50 rpm | 3,446 cps |
| softening point | 68° C. (154.4° F.) |
| needle penetration at 25° C. (77° F.) | 66 dmm |
| cone penetration at 25° C. (77° F.) | 60 dmm |
| resilience at 25° C. (77° F.) | 17% |
| flexibility at −18° C. (0° F.) | pass |
| ductility at 25° C. (77° F.) | 150+ cm |
| elastic recovery at 25° C. (77° F.) | 81.25% |
| insoluble matter, ASTM D 5546 | 2.24% |

This material is expected to comply with specifications for a PG-TR 64-28 tire rubber modified binder with the exception of the viscosity at 135° C. The specifications call however for viscosity to be measured by a smooth geometry bobbin-type spindle, which is not suitable for mineral-filled asphalts, whereas the spindle used herein is suitable.

In the claims appended hereto, the term "a" or "an" is intended to mean "one or more." The term "comprise" and variations thereof such as "comprises" and "comprising," when preceding the recitation of a step or an element, are intended to mean that the addition of further steps or elements is optional and not excluded. All patents, patent applications, and other published reference materials cited in this specification are hereby incorporated herein by reference in their entirety. Any discrepancy between any reference material cited herein and an explicit teaching of this specification is intended to be resolved in favor of the teaching in this specification. This includes any discrepancy between an art-understood definition of a word or phrase and a definition explicitly provided in this specification of the same word or phrase.

What is claimed is:

1. A process for incorporating recycled tire rubber in an asphalt mastic, said process comprising:
   (a) forming a mixture consisting of (i) carbonaceous waste solids in the form of particles whose longest dimension is a maximum of about 1 mm, (ii) recycled tire rubber in the form of particles whose longest dimension is a maximum of about 1 mm, (iii) optionally an oil selected from the group consisting of crude oil, a liquid petroleum fraction, motor oil, tall oil, agriculturally-derived oil, and (iv) clarified slurry oil;
   (b) subjecting said mixture to a heat treatment by maintaining said mixture at a temperature of from about 100° C. to about 260° C. for a duration of from about 30 minutes to about 24 hours to release moisture and volatile organics from said recycled tire rubber and thereby cause a reduction in weight of said mixture of at least about 10% prior to combining said mixture with asphalt; and
   (c) combining said mixture following said heat treatment with a liquid asphalt composition to form said asphalt mastic.

2. The process of claim 1 wherein said mixture consists of (i) carbonaceous waste solids in the form of particles whose longest dimension is a maximum of about 1 mm, (ii) recycled tire rubber in the form of particles whose longest dimension is a maximum of about 1 mm, and (iii) an oil selected from the group consisting of crude oil, a liquid petroleum fraction, motor oil, tall oil, agriculturally-derived oil, and clarified slurry oil.

3. The process of claim 1 wherein said carbonaceous waste solids are a member selected from the group consisting of centrifuged water-bearing petroleum refinery solids, centrifuged dehydrated petroleum refinery solids, activated carbon, fines from a catalytic cracking operation, and fines from a petroleum coking operation.

4. The process of claim 1 further comprising incorporating into said asphalt mastic a penetration lowering agent.

5. The process of claim 4 wherein said penetration lowering agent is a member selected from the group consisting of elastomers, microcrystalline wax, and gilsonite.

6. The process of claim 1 wherein said duration of step (b) is from about 30 minutes to about 5 hours.

7. The process of claim 1 wherein said recycled tire rubber constitutes from about 3% to about 30% by weight of said asphalt mastic.

8. The process of claim 1 wherein said recycled tire rubber constitutes from about 5% to about 20% by weight of said asphalt mastic.

9. The process of claim 1 wherein said mixture of step (a) contains a recycled tire rubber to waste products weight ratio of from about 0.3:1 to about 5:1.

10. The process of claim 1 wherein said mixture of step (a) contains a recycled tire rubber to waste solids weight ratio of from about 0.5:1 to about 3:1.

11. The process of claim 1 wherein said temperature of step (b) is from about 115° C. to about 250° C.

12. The process of claim 1 wherein said waste solids are centrifuged water-bearing petroleum refinery solids.

13. The process of claim 1 wherein step (c) further comprises subjecting said mixture and said liquid asphalt composition to high shear to render said asphalt mastic substantially uniform in consistency.

14. A process for incorporating recycled tire rubber in an asphalt mastic, said process comprising:
   (a) subjecting recycled tire rubber, comminuted to particles whose longest dimension is a maximum of about 1 mm, to a heat treatment by maintaining said recycled tire rubber at a temperature of from about 204° C. to about 260° C. for a duration of from about 20 minutes to about 2 hours to release moisture and volatile organics from said recycled tire rubber and thereby cause a reduction in weight of said recycled tire rubber of at least about 10% prior to combining said recycled tire rubber with asphalt;
   (b) following said heat treatment, forming a mixture consisting of said recycled tire rubber, a liquid asphalt composition, optionally an oil selected from the group consisting of crude oil, a liquid petroleum fraction, motor oil, tall oil, agriculturally-derived oil, and slurry oil, and optionally a penetration lowering agent selected from the group consisting of elastomers, microcrystalline wax, and gilsonite, and applying high shear to said mixture to produce said asphalt mastic.

15. The process of claim 14 wherein said mixture consists of said recycled tire rubber, a liquid asphalt composition, and an oil selected from the group consisting of crude oil, a liquid petroleum fraction, motor oil, tall oil, agriculturally-derived oil, and slurry oil.

16. The process of claim 14 wherein said mixture consists of (i) said recycled tire rubber, a liquid asphalt composition, (ii) an oil selected from the group consisting of crude oil, a liquid petroleum fraction, motor oil, tall oil, agriculturally-derived oil, and slurry oil, and (iii) a penetration lowering agent selected from the group consisting of elastomers, microcrystalline wax, and gilsonite.

17. The process of claim 14 wherein said recycled tire rubber constitutes from about 3% to about 30% by weight of said asphalt mastic.

18. The process of claim 14 wherein said recycled tire rubber constitutes from about 5% to about 20% by weight of said asphalt mastic.

19. The process of claim 14 wherein said temperature of step (a) is from about 220° C. to about 250° C. and is sufficient to cause a weight reduction in said recycled tire rubber of at least about 10%.

* * * * *